(12) United States Patent
Ozersky et al.

(10) Patent No.: US 8,927,456 B2
(45) Date of Patent: Jan. 6, 2015

(54) ABSORBENT FIBROUS GRANULES

(71) Applicant: Inkastrans (Canada) Ltd., Toronto (CA)

(72) Inventors: Alexander Ozersky, Richmond Hill (CA); David Khazanski, Richmond Hill (CA)

(73) Assignee: Inkastrans (Canada) Ltd., Toronto, Ontario (CA)

( * ) Notice: Subject to any disclaimer, the term of this patent is extended or adjusted under 35 U.S.C. 154(b) by 53 days.

(21) Appl. No.: 13/915,470

(22) Filed: Jun. 11, 2013

(65) Prior Publication Data

US 2014/0364306 A1    Dec. 11, 2014

(51) Int. Cl.
    *C09K 3/32*  (2006.01)
(52) U.S. Cl.
    CPC ............... *C09K 3/32* (2013.01); *Y10S 502/515* (2013.01); *Y10S 502/518* (2013.01)
    USPC ............ 502/401; 502/404; 502/515; 502/518
(58) Field of Classification Search
    USPC .................. 502/402, 401, 404, 515, 518, 526
    See application file for complete search history.

(56) References Cited

U.S. PATENT DOCUMENTS

| | | |
|---|---|---|
| 3,770,575 A | 11/1973 | Ball |
| 4,670,156 A | 6/1987 | Grenthe |
| 4,780,518 A | 10/1988 | Ceaser |
| 4,925,343 A | 5/1990 | Raible et al. |
| 5,021,390 A | 6/1991 | Hatton |
| 5,035,804 A | 7/1991 | Stowe |
| 5,094,604 A | 3/1992 | Chavez et al. |
| 5,492,881 A | 2/1996 | Diamond |
| 5,507,074 A | 4/1996 | Chen et al. |
| 5,585,319 A | 12/1996 | Saitoh et al. |
| 5,909,718 A | 6/1999 | Sheehan |
| 5,970,582 A | 10/1999 | Stover |
| 6,027,652 A | 2/2000 | Hondroulis et al. |
| 6,092,302 A | 7/2000 | Berrigan |
| 6,444,611 B1 | 9/2002 | Solis |
| 7,038,104 B1 | 5/2006 | Eifling et al. |
| 7,229,560 B2 | 6/2007 | Rink et al. |
| 7,655,149 B1 | 2/2010 | Shaffer et al. |
| 2013/0087503 A1 | 4/2013 | Youngs et al. |

FOREIGN PATENT DOCUMENTS

| | | |
|---|---|---|
| WO | 01/10547 A2 | 2/2001 |
| WO | 01/11126 A1 | 2/2001 |
| WO | 2007/116473 A1 | 10/2007 |
| WO | 2011/019304 A2 | 2/2011 |

*Primary Examiner* — Edward Johnson
(74) *Attorney, Agent, or Firm* — Hill & Schumacher

(57) ABSTRACT

The present disclosure provides hydrocarbon absorbent granules, comprising granulated particles each including a mixture of hydrophobic non-self associating raw cotton sorbent fibers and a binding agent. The granules have an average diameter in a range from about 1 to about 7 cm and have a density in a range from about 0.03 to 0.1 grams per cubic centimeter. The binding agent constitutes from about 0.5 to about 70 percent by weight of granule. The granules are characterized in that they exhibit a sorbency ratio in a range from about 7 to about 30.

21 Claims, 2 Drawing Sheets

ABSORBENT FIBROUS GRANULES

FIELD

The present disclosure relates to highly efficient oil absorbent fibrous granules for oil spill cleanup and methods for making same.

BACKGROUND

Oil sorbent devices are very well known in the art. They come in shapes of sheets, sweeps, blankets, pads, pillows, mats, etc., in many different sizes. Rather thin (normally no thicker than ½ inch) nonwoven polypropylene or cotton sheets, sweeps, blankets, pads are commonly used for collection of oil on solid surfaces and water, and widely described in the suppliers brochures and literature (e.g. The Basics of Oil Spill Cleanup by Mery Fingas, The Second Edition, pp. 105-106).

Another type of absorbent are fibrous granulated sorbents which may be loose (particulate, granular, fibrous) and are used for absorbing oil, after an oil spill, and other hydrocarbons on water and dry surfaces. All known the sorbents can be classified into three major groups including natural inorganic sorbents, natural organic sorbents, and synthetic sorbents. A fourth group of sorbents may be engineered sorbents.

Natural inorganic (mineral) sorbents include clay, sand, perlite, vermiculite, etc. These sorbents have relatively high density, and after they are spread on the surface of a body of water they sink. It has been found that treatment of these mineral sorbents with hydrophobic agents does not provide them with sufficient and prolonged buoyancy on the surface of water. In addition, another drawback of mineral sorbents is their relatively low oil sorption, or oil sorbency ratio (weight of absorbed oil divided by original "dry" weight of the sorbent), which is usually below 2.

Natural organic sorbents include various vegetable fibre, cellulose, wood sawdust and chips, corncob components, rice hulls, peanut shells, straw, peat moss, etc. While these organic sorbents are biodegradable a major drawback to them is that they sink, which is a problem with most of natural organic sorbents, which is harmful to the environment.

There are several patents relating to hydrophobic non-sinking fibrous sorbents. For example, U.S. Pat. No. 3,770,575 discloses oil sorbent materials prepared from cellulose pulp which have been treated with a sizing material to render the fibers water repellant. U.S. Pat. No. 4,670,156 discloses a hydrophobic sorbent, which is prepared by subjecting a water-containing, fibrous cellulosic product, particularly sulphite reject fibers, to rapid heating to cause expansion of the fibers through gasification of the water therein. U.S. Pat. No. 5,021,390, Hatton teaches a composition for absorbing liquids consisting of various fibrous plant materials (wood fibers, bagasse, grass, rice hulls and corn husks) treated with the waterproofing agent sodium methyl silicate. U.S. Pat. No. 5,492,881 teaches a sorbent system using finely ground cellulose treated with a hydrophobic agent such as paraffin, other waxes, polyvinyl alcohol, hydroxyl-ethyl cellulose, or the like.

A general shortcoming of all the above mentioned natural organic sorbents is the relatively low sorption ratios, which is typically about 2 to 3 and practically does not go above 5 to 6. Another disadvantage of the natural cellulose sorbents is that, even when treated by water repellent agents, they have only a partial and temporary hydrophobicity, so that in time they break down and absorb water. When picking up water, they sink below the level of the oil and the water takes up much of their sorption capacity. So there is little room remaining for absorption of oil.

U.S. Pat. No. 6,027,652 discloses a naturally hydrophobic sorbent fiber material produced from agricultural byproducts including cultivation of banana, plantain, cavendish plant, pineapple, coconut, palm, or other tropical fruit bearing plants. However the availability of such fibers is not sufficient for large scale production of sorbents, especially in the regions where these fruits are not cultivated.

The above described natural organic and inorganic sorbents come in the form of powders or fibers, which creates another problem, namely difficulty in their spreadability on oil spills and their collection with the absorbed oil, as well as dusting. This problem is addressed in part by U.S. Pat. No. 6,092,302 which proposes absorbent fibrous granules. The granulated absorbent has essential advantages from point of its distribution and collection in compare to absorbent in form of powder or fibers. One problem with the granules according to the U.S. Pat. No. 6,092,302 is that they are "a cellulosic-based", i.e. made from naturally hydrophilic fibers, and accordingly have limitation for use in aqueous environments. Another drawback is the high cost of the granules, since they are made by "wet" method with subsequent power-intensive and expensive drying process. Further, cellulosic-based granules have a relatively low oil sorption typical for cellulose sorbents in general.

The synthetic loose sorbents are reputed to have high oil sorption capacity and may be made from polyurethane, polyethylene, polypropylene and polyester, and come in the form of chunks, cubes, powders, fibers, etc. French Patent No. 2,460,987 discloses a powdered oil sorbent made from a semi-rigid or rigid polyurethane foam. These polymer materials in their known forms have the same problems as those mention above with respect to the inorganic and organic sorbents, namely difficulty in spreading them onto oil spills, dusting, and problematic collection with absorbed oil. With respect to collection of the oil filled sorbents, the synthetic sorbents are not biodegradable per se, and therefore it is desirable to completely recover them from water or land after their use.

SUMMARY

The present disclosure provides hydrocarbon absorbent granules, comprising granulated particles each including a mixture of hydrophobic non-self associating raw cotton sorbent fibers and a binding agent. The cotton granules have an average diameter in a range from about 1 to about 7 cm and have a density in a range from about 0.03 to 0.1 grams per cubic centimeter. The binding agent constitutes from about 0.5 to about 70 percent by weight of granule. The granules are characterized in that they exhibit a sorbency ratio in a range from about 7 to about 30.

In another embodiment, there is provided a method of producing absorbent fibrous granules comprising:
a) mixing hydrophobic non-self associating raw cotton sorbent fibers with a binding agent, said binding agent constitutes from about 0.5 to about 70 percent by weight of said granules, heating and extruding the mixture through an extruder to solidify the mixture;
b) cutting the extrudate once extruded to form granules having an average diameter in a range from about 1 to about 7 cm, said granules having a density in a range from about 0.03 to 0.1 grams per cubic centimeter, said granules characterized in that they exhibit a sorbency ratio in a range from about 7 to about 30.

A further understanding of the functional and advantageous aspects of the disclosure can be realized by reference to the following detailed description and drawings.

BRIEF DESCRIPTION OF THE DRAWINGS

Embodiments of the absorbent granules will now be described, by way of example only, with reference to the drawings, in which.

DETAILED DESCRIPTION

Figure 1:
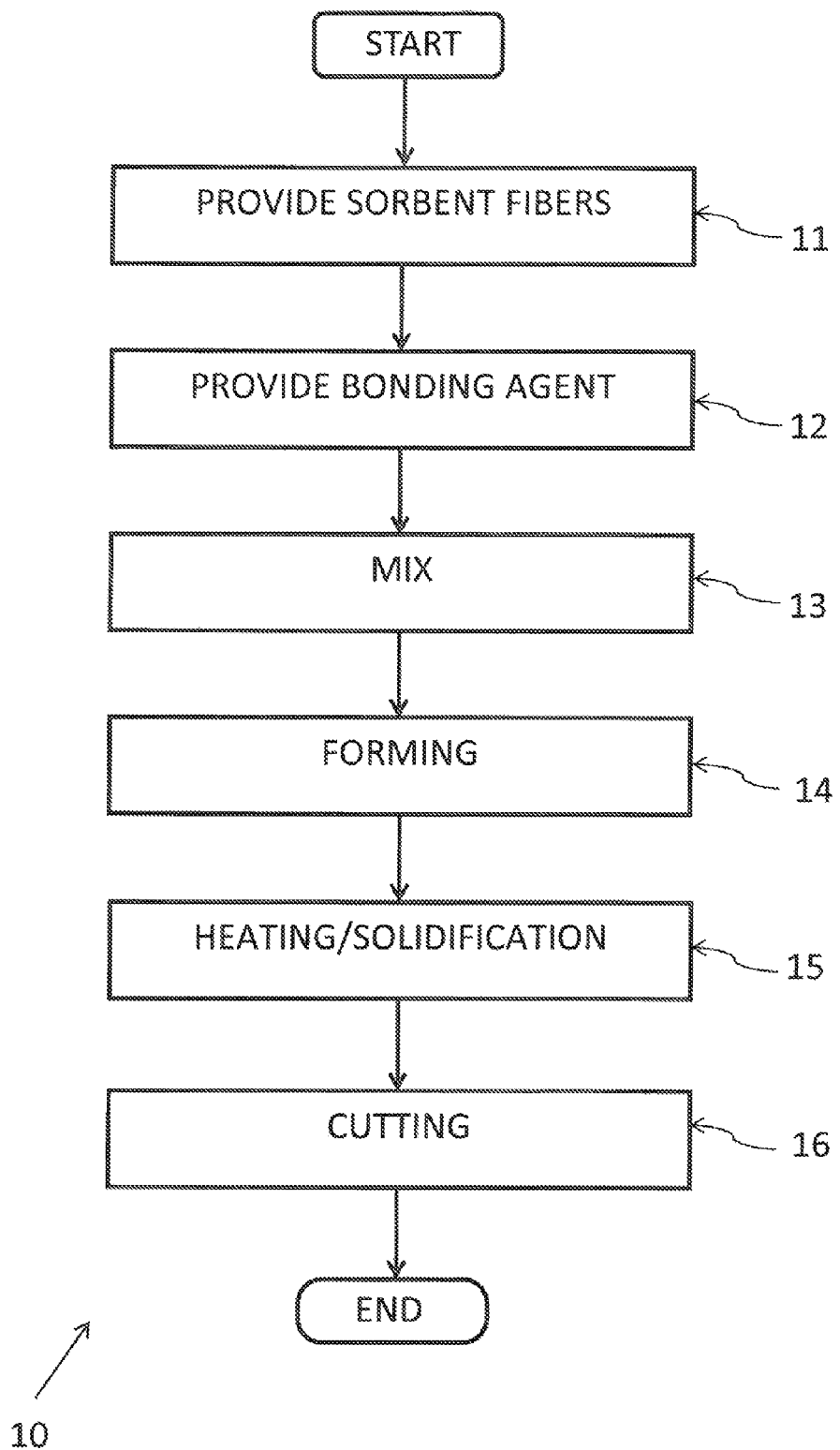
FIG. 1 is a flow chart of a method of making the absorbent fibrous granules according to one embodiment of the invention.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "example", "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the phrase "non-self associating raw cotton fibers" means that no chemical bonding occurs between these fibers without introducing additional materials or energy.

As used herein, the phrase "non-self associating binder fibers" means that no any chemical bonding occurs between these fibers without introducing additional materials or energy.

As used herein, the phrase "sorbency ratio", or "oil sorption" means the ratio of absorbed oil weight to a sorbent weight, and is equal to a weight of oil in grams absorbed by a sorbent divided by the original (dry) weight in grams of the sorbent Broadly speaking, the present invention provides absorbent granules, which comprise hydrophobic absorbent fibers bound together by a binding agent. The granules are formed by the absorbent fibers being mixed with a chemical binder or with a heat sensitive material in the form of fusible fibers or powders, which binds the absorbent fibers by the action of heat or ultrasonic treatment or high frequency current.

The absorbent fibrous granules may be made by a method which comprises the steps of mixing the hydrophobic fibers with a binding agent, feeding the mixture to an extruder and forming the mixture by extruding it through the extruder; heating mixture inside extruder by direct heating of the extruder or by exposing the mixture inside the extruder to ultrasound treatment or by exposing the mixture inside the extruder to high frequency current treatment; and solidifying the mixture moving inside the extruder and once the mixture exits the extruder then cutting the extrudates downstream of the outlet of the extruder into pieces/granules.

In an embodiment, the absorbent fibrous granules may comprise a natural fibrous component being any one or combination of naturally hydrophobic raw cotton or raw cotton waste, wool, naturally hydrophobic or hydrophobized wood fibers, hydrophobized cellulose, peat moss, etc. In another embodiment, the absorbent fibrous granules may comprise a polymer fibrous component being any one or combination of polypropylene, polyethylene, and polyurethane fibers. Alternatively, the absorbent fibrous granules may comprise a mixture of the natural and polymer fibrous component in any of their proportions.

The binding agent may include non-self associating thermo-sensitive fusible fibers, fusible powders, granules, flakes and mixtures thereof.

Specifically, the binding agent may be a chemical binder, for example latex, starch or from the group of thermo-sensitive binders such as non-self associating fusible fibers or fusible powders. The latex may be any one or combination of acrylics, styrene acrylates, vinyl acetate, vinyl acrylic, ethylene vinyl acetate, styrene butadiene rubber, polyvinyl chloride, ethylene vinyl chloride. The granules and the flakes may be any one or combination of polyesters, polyamides, polypropylenes, and polyethylenes with mesh sizes in a range from about 3 to about 10.

The thermo-sensitive fiber binders may be selected from the following morphologically classified groups, amorphous homopolymers, amorphous copolymers, crystalline copolymers, and bi-component fibers. The thermo-sensitive fibers binders may be selected from the following chemically classified groups including polyesters, polypropylenes, polyethylenes, polyamides, vinyl chlorides, and vinyl acetate copolymer with an average diameter in a range from about 40 nanometers to about 400 micrometers, preferable in a range from about 10 micrometers to 100 micrometers, and an aspect ratio of greater than 2, in a range from 2 to about 10,000, preferably in a range from about 20 to about 500.

The thermo-sensitive powdered binders may be any one or combination of polyesters, polyamides, polypropylenes, and polyethylenes with mesh sizes in a range from about 12 to about 600, preferably in a range from about 20 to about 120.

The granules may comprise thermoplastic hydrophobic polymer fibers bound together by their partial melting in which the application of heat, ultrasonic treatment or high frequency current being passed through the mixture causes the partial melting.

The absorbent fibrous granules may also include a polymer fibrous component such as anyone or combination of polypropylene, polyethylene, thermoplastic polyurethane fibers, and polyester.

FIG. 1 shows a flowchart 10 of a method of making the absorbent fibrous granules according to an embodiment of the invention. In step 11, the hydrophobic non-self associating raw cotton sorbent fibers are provided. Since the final product of absorbent fibrous granules are designed primarily for collection of oil and oil products on water, hydrophobic sorbent fibers are selected as the main component which may be a natural fibrous component such as naturally hydrophobic raw cotton or raw cotton waste (cotton based hydrophobic non-self associating fibers are preferred), wool, naturally hydrophobic or hydrophobized wood fibers, hydrophobized cellulose, peat moss. It may be a polymer fibrous polymer such as polypropylene, polyethylene, polyester, and polyurethane fibers. It may be a mixture of the above mentioned natural and polymer fibers in any proportion.

In step 12 the bonding agent is added to the sorbent fibers and as mentioned above may be any one or combination of chemical binders such as latexes, starches or thermo-sensitive binders such as fusible fibers or fusible powders.

In step 13, the sorbent fibers and the binding agent are mixed together. Any suitable for mixing the selected sorbent fibers and the selected binders batch or continuous mixers and blenders may be used for this operation.

In step 14, the intermixed sorbent fibers and the bonding agent blend is fed into flow channels, or barrels of the extruder, where the mixture is formed by extruding it through the barrels.

In step 15, as the mixture moves through the barrels of the extruder the mixture is heated by any one of several known techniques, including direct heating of the barrels or by exposing the mixture inside barrels to ultrasound treatment, or by exposing the mixture inside the barrels to high frequency current treatment. Any of these treatments will cause solidification of the mixture moving through the barrel of the extruder.

In step 16, the solidified extrudates are cut at the outlet of the barrels to pieces/granules by an one of several known techniques, including but not limited to, guillotine cutting machine, knives, scissors, saw, air jet cutter, laser or any other known cutter.

The resulting cotton granules have an average diameter in a range from about 1 to about 7 cm (but may be smaller from about 2 to about 5 cm, or from about 1.5 to about 3.0 cm) and have a density in a range from about 0.03 to 0.1 grams per cubic centimeter (or from about 0.05 to about 0.08 grams per cubic centimeter). The binding agent constitutes from about 0.5 to about 70 percent by weight of granule. The granules are characterized in that they exhibit a sorbency ratio in a range from about 7 to about 30 but may exhibit a sorbency ratio of 12 to 16 which are very efficient at absorbing hydrocarbons.

Figure 2:
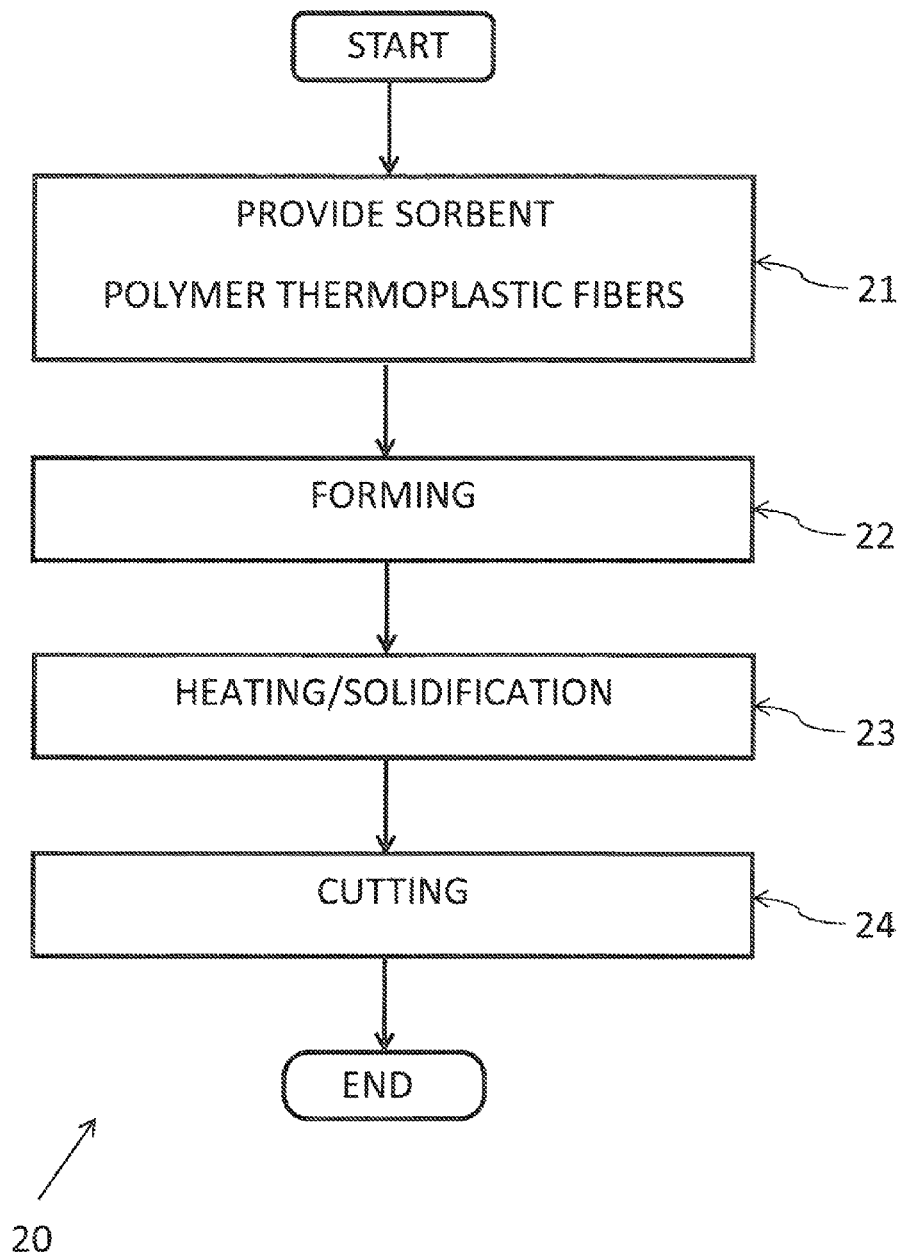
FIG. 2 is a flow chart of a method of making the absorbent fibrous granules according to another embodiment of the invention.

FIG. 2 shows a flowchart 20 of a method of making the absorbent fibrous granules according to another embodiment of the invention which uses polymer based hydrophobic non-self associating fibers that do not need a binder material. In step 21, the fibers being any one or combination of polypropylene, polyethylene, polyester, thermoplastic polyurethane fibers, are provided. In step 22, the fibers are fed into the flow channels, or barrels of the extruder, where the mixture is formed by pushing it through the barrels. In step 23, the moving inside the barrels fibers are heated by direct heating of the barrels, or by exposing the mixture inside barrels to ultrasound treatment, or by exposing the mixture inside the barrels to high frequency current treatment. The heat causes solidification of the polymer thermostatic fibers moving inside the barrel. In step 24, the solidified extrudates are cut at the outlet of the barrels to pieces/granules by a guillotine, knives, scissors, saw, air jet cutter, laser or any other known cutting machine.

The absorbent fibrous granules produced in accordance with the methods disclosed herein were evaluated in compare with the most popular and successful oil sorbents existing on the market. The present granules made with sorbent cotton waste fibers and bonding bi-component polyester fibers were supplied by Jasztex (Montreal, QC), mixed in proportion 4:1, and were extruded through an extruder barrel with internal diameter ½ inch and within one minute and the barrel temperature was about 165° C. The behavior of these granules were compared to known oil sorbents including Micronized Polyurethane (MPU) Sorbent from Mobius Technologies Inc. (Lincoln, Calif.), CanSorb which is Peat Moss from Annapolis Valley Peat Moss Co. (Berwick, NS); Absorbent W-Hydrophobized Cellulose from Absorption Corp. (Ferndale, Wash.); KenGro-Kenaf Sawdust from Kengro Corp. (Charleston, Miss.); and 3M™ Sorbent T-210-Polypropylene Fibers from 3M Company (Maplewood, Minn.). Motor oil 10W-30 (accepted as a standard for lab oil sorption tests) on water was used in these tests. The tested sorbents are placed on the oil layer covering water.

The results of the tests are reported in the Table 1.

TABLE 1

| Sorbent | Material | Sorbency Ratio, gram/gram |
| --- | --- | --- |
| MPU | Micronized Polyurethane | 4.4 |
| CanSorb | Peat Moss | 5.6 |
| Absorbent W | Hydrophobized Cellulose | 5.8 |
| KenGro | Kenaf Saw Dust | 6.2 |
| 3M ™ Sorbent T-210 | Polypropylene Fibers | 10.2 |
| Inkas Sorbent | Proprietary Cotton Granules | 14.4 |

The data in the Table 1 demonstrates that the absorbent fibrous granules produced in accordance with the present invention exhibit the highest oil sorbency rate in comparison with other the most popular and successful oil sorbents currently on the market. The absorbent fibrous granules produced according to the present invention are able to pick up three times more oil (gram of oil per gram of oil sorbent) than MPU. The granules disclosed herein are able to absorb about twice as much oil compared to oil sorbents from CanSorb, KenGro and Absorbent W, and since the present sorbent granules have comparable price with these oil sorbents CanSorb, KenGro, Absorbent W, the present granules are more cost effective. In addition, the present granules have a price that is about 50% less than the 3M™ Sorbent T-210, and are able to pick about 40% more oil than 3M™ Sorbent T-210. Thus, the cost of oil cleanup ($ per a gallon of the retrieved oil) using the present granules is lower than by known oil sorbents.

As noted above, in addition to cotton granules, other granules may be used for efficient hydrocarbon cleanup. For example hydrocarbon absorbent granules may be made of granulated particles each including a mixture of hydrophobic non-self associating polypropylene fibers and a binding agent, said granules having an average diameter in a range from about 1 to about 7 cm, said granules having a density in a range from about 0.03 to 0.1 grams per cubic centimeter, said binding agent constitutes from about 0.5 to about 70 percent by weight of the granules, said granules characterized in that they exhibit a sorbency ratio in a range from about 7 to about 30.

These absorbent granules may have an average diameter from 2 to 5 cm, or in a range from 0.5 to 10 cm, and more preferred in a range from 1.5 to 3.0 cm.

These absorbent granules preferably have a density in a range from about 0.05 to 0.08 grams per cubic centimeter and a preferred sorbency range is from about 12 to about 16.

The binding agent may include non-self associating binder fibers.

Therefore what is claimed is:

1. Hydrocarbon absorbent granules, comprising:
    granulated particles each including a mixture of hydrophobic non-self associating raw cotton sorbent fibers and a binding agent, said granules having an average diameter in a range from about 1 to about 7 cm, said granules having a density in a range from about 0.03 to 0.1 grams per cubic centimeter, said binding agent constitutes from about 0.5 to about 70 percent by weight of the granules, said granules characterized in that they exhibit a sorbency ratio in a range from about 7 to about 30.

2. The absorbent granules of claim 1, wherein the granules have an average diameter from about 2 to about 5 cm.

3. The absorbent granules of claim 1, wherein the granules have an average diameter from about 0.5 to about 10 cm.

4. The absorbent granules of claim 1, wherein the granules have an average diameter from about 1.5 to about 3.0 cm.

5. The absorbent granules of claim 1, wherein the granules have a density in a range from about 0.05 to 0.08 grams per cubic centimeter.

6. The absorbent granules of claim 1, wherein the granules exhibit a sorbency ratio in a range from about 12 to about 16.

7. The absorbent granules of claim 1, wherein the binding agent includes non-self associating thermo-sensitive fusible fibers, fusible powders, granules, flakes and mixtures thereof.

8. The absorbent fibrous granules of claim 7, wherein said non-self associating thermo-sensitive fusible fibers comprise amorphous homopolymers, amorphous copolymer, crystalline copolymer, and bi-component fiber made from polyester, polypropylene, polyethylene, polyamide, and vinyl chloride, vinyl acetate copolymer and any combination thereof.

9. The absorbent fibrous granules of claim 7, wherein said fusible powders are made from any one or combination of polyester, polyamide, polypropylene, polyethylene and nylon.

10. The absorbent fibrous granules of claim 1, wherein said binding agent comprises latex.

11. The absorbent fibrous granules of claim 10, wherein said latex is any one or combination of acrylic, styrene acrylates, vinyl acetate, vinyl acrylic, ethylene vinyl acetate, styrene butadiene rubber, polyvinyl chloride, ethylene vinyl chloride and mixture thereof.

12. The absorbent fibrous granules of claim 1, wherein said binding agent constitutes from about 5 to 40 percent by weight of the said granule.

13. The absorbent fibrous granules of claim 1, wherein said binding agent constitutes from about 15 to 25 percent by weight of the said granule.

14. A method of producing absorbent fibrous granules comprising:
    c) mixing hydrophobic non-self associating raw cotton sorbent fibers with a binding agent, said binding agent constitutes from about 0.5 to about 70 percent by weight of said granules, heating and extruding the mixture through an extruder to solidify the mixture;
    d) cutting the extrudate once extruded to form granules having an average diameter in a range from about 1 to about 7 cm, said granules having a density in a range from about 0.03 to 0.1 grams per cubic centimeter, said granules characterized in that they exhibit a sorbency ratio in a range from about 7 to about 30.

15. The method of claim 14, wherein the binding agent includes non-self associating thermo-sensitive fusible fibers, fusible powders, granules, flakes and mixtures thereof.

16. The method of claim 15, wherein said non-self associating thermo-sensitive fusible fibers comprise amorphous homopolymers, amorphous copolymer, crystalline copolymer, and bi-component fiber made from polyester, polypropylene, polyethylene, polyamide, and vinyl chloride, vinyl acetate copolymer and any combination thereof.

17. The method of claim 15, wherein said fusible powders are made from any one or combination of polyester, polyamide, polypropylene, polyethylene and nylon.

18. The method of claim 14, wherein said binding agent comprises latex.

19. The method of claim 18, wherein said latex is any one or combination of acrylic, styrene acrylates, vinyl acetate, vinyl acrylic, ethylene vinyl acetate, styrene butadiene rubber, polyvinyl chloride, ethylene vinyl chloride and mixture thereof.

20. The method of claim 14, wherein said binding fibers constitute from about 5 to 40 percent by weight of the said granule.

21. The method of claim 14, wherein said binding fibers constitute from about 15 to 25 percent by weight of the said granule.

* * * * *